United States Patent [19]

Feldman et al.

[11] 3,970,520

[45] July 20, 1976

[54] NUTRITIONALLY IMPROVED FOODSTUFFS

[75] Inventors: Jacob Richard Feldman, New City, N.Y.; Gerhard Julius Haas, Woodcliff Lake, N.J.; Joaquin Castro Lugay, Thornwood, N.Y.

[73] Assignee: General Foods Corporation, White Plains, N.Y.

[22] Filed: July 28, 1975

[21] Appl. No.: 599,754

Related U.S. Application Data

[63] Continuation-in-part of Ser. No. 398,291, Sept. 17, 1973, abandoned, which is a continuation-in-part of Ser. No. 126,261, March 19, 1971, abandoned.

[52] U.S. Cl. .................................. 195/29; 426/7; 426/32; 426/34; 426/41; 426/42; 426/46; 426/59
[51] Int. Cl.² .................................................. A23J 3/00
[58] Field of Search ............ 195/29; 426/7, 34, 46, 426/59, 32, 42, 41

[56] References Cited
UNITED STATES PATENTS

| | | | |
|---|---|---|---|
| 2,364,008 | 11/1944 | Stuart | 195/29 X |
| 2,489,880 | 11/1949 | Hand et al. | 195/29 |
| 2,502,482 | 4/1950 | Sair et al. | 426/46 |
| 2,536,171 | 1/1951 | Hall et al. | 195/29 |
| 2,676,888 | 4/1954 | Westfall | 426/28 |
| 2,872,319 | 2/1959 | Wretlind | 195/29 |
| 3,260,606 | 7/1966 | Azuma | 426/47 |
| 3,578,461 | 5/1971 | Weeks et al. | 195/29 X |
| 3,640,725 | 2/1972 | Sherba et al. | 426/46 |
| 3,741,771 | 6/1973 | Pourel et al. | 426/46 |
| 3,761,353 | 9/1973 | Noe et al. | 195/29 |

*Primary Examiner*—James R. Hoffman
*Attorney, Agent, or Firm*—Thaddius J. Carvis; Daniel J. Donovan

[57] ABSTRACT

Foodstuffs of improved nutritive quality are obtained by incorporating enzymatically hydrolyzed non-gelatin proteinaceous materials into the foodstuffs. It has been discovered that organoleptic properties, color, clarity and the overall characteristics of the foodstuffs are not adversely affected by the inclusion of these soluble hydrolyzed proteins which are heat and acid stable.

8 Claims, No Drawings

NUTRITIONALLY IMPROVED FOODSTUFFS

BACKGROUND OF THE INVENTION

This application is a continuation-in-part of U.S. application Ser. No. 398,291, filed Sept. 17, 1973, which in turn is a continuation-in-part of U.S. application Ser. No. 126,261, filed Mar. 19, 1971 both now abandoned.

This invention relates to foodstuffs or food materials having improved or enhanced nutritive properties and particularly to a method for preparing a nutritious, soluble protein supplement.

Numerous attempts have been made to enhance the nutritive qualities of high-demand, frequently consumed food products such as gelatin containing desserts, hot beverages, carbonated beverages and other similar products. However, these attempts have met with failures for a multitude of reasons, including the unacceptable organoleptic qualities of taste and flavor impairment occasioned by introducing certain nutritive additives, i.e., certain proteins or polypeptides into the food product. Public taste perception of conditioned associative dessert and beverage taste is such that it will not favorably receive obvious tastes associated with known "main course" meats or proteins despite the increased nutritive benefits.

On the other hand, various polypeptides and amino acids which can be easily incorporated in these food products without adversely affecting organoleptic taste properties are far less nutritive, i.e., acid hydrolyzed proteins.

Further compounding past attempts to obtain nutritionally fortified food products is the fact that certain proteinaceous additives tend to detract from or diminish qualities traditionally regarded as beneficial to the food material. For example, in the case of gelatin containing desserts, certain proteinaceous additives tend to unduly alter the gelatin set rate and the gel strength, and destroy the clarity which commonly typifies gelatin dessert.

The object of this invention is to provide organoleptically acceptable food products having improved nutritive properties. A further object of the invention is to provide nutritionally improved food products substantially, beneficial characteristics commonly associated with the products.

A yet further object is to provide nutritionally improved food products having a clarity or lucidity which is unimpaired by the nutritive proteinaceous material.

A still further object following extraction and washing or washing of the isolate alone, is to provide a process for degrading or hydrolyzing the proteinaceous isolates to a bland taste, and yet maintain some nutritional quality or protein value intact.

Other objects and advantages of the invention will be apparent in the description and claims hereinafter following.

SUMMARY OF THE INVENTION

It has now been discovered that food products employing edible gelatin and various other materials may be prepared by hydrolyzing various non-gelatin proteins with specific proteolytic enzymes, and incorporating the enzymatically hydrolyzed proteins into the product. The source of protein may be derived from animal or vegetable matter or combinations thereof, the respective benefits being that the animal source provides better nutritional qualities, while the vegetable source provides acceptable nutritional qualities at more favorable cost. In any event, proteinaceous material contemplates within the purview of this invention, nutritious, e.g., non-gelatin, proteinaceous materials derived from both animal and vegetable origins.

Essentially, the steps involved entail extracting and washing the proteinaceous material, proteolytically hydrolyzing the isolate proteinaceous material, deactivating the enzyme, and separating and drying the hydrolyzed proteinaceous material prior to adding it in certain quantities to the particular foodstuff.

Enzymatic hydrolysis of proteinaceous isolates is less drastic and not destructive compared with acid hydrolysis, and leaves nutritive low molecular weight polypeptides intact. Whereas, during acid hydrolysis of proteinaceous isolates of the nutritive polypeptides, essential amino acids such as serine, threonine, tryptophan and methionine are destroyed, thereby lowering the overall nutrition value of the resulting hydrolyzate.

DETAILED DESCRIPTION OF THE INVENTION

The process of the invention essentially entails extracting the protein from its source (animal or vegetable), and thereafter washing the proteinaceous isolate to remove taste and odors associated with the source, as well as soluble carbohydrates and salts. The resulting proteinaceous isolate is then enzymatically hydrolyzed and incorporated in the particular foodstuff.

The process of the present invention can be successfully employed to hydrolyze isolated proteins from any source. Specifically, animal and vegetable proteins are contemplated. Preferred among these are the isolates of whey, egg albumen, whey protein and soy protein. Soy, whey and fish protein isolates are particularly preferred.

The protein isolates can be selected from those which are available from a wide variety of commercial sources or they can be prepared according to techniques well known to the art. Soy protein available commercially as Promine D soy isolate has been found suitable; as have whey protein, available as spray dried whey powder or concentrated whey (e.g., Fortein 35); egg albumen, available as fresh or dried egg white (e.g., Henningson P20 dried egg white); and fish protein (e.g., Astra-Nabisco EFP-90 eviscerated fish protein).

Generally, in preparing a protein isolate, the proteinaceous source material is first extracted with water to prepare an aqueous protein solution. For proteins such as soy, the pH of the extractment should be adjusted to significantly above the isoelectric point. The resulting protein solution is then treated by acidifying, heating or both to obtain a precipitate which is separated from the supernatant. This recovered precipitate is the protein isolate. It is necessary to the present invention to wash the isolate with effective volumes of water to substantially remove off flavors and odors. With proteins such as soy which have a degree of solubility at near neutral pH, it is necessary to make the wash water dilutely acid, e.g., from about pH 4.0 to 5.0, to reduce protein loss due to solubilization in the wash water. Typically, the proteins are washed by preparing a suspension of the isolate in water of suitable pH and separating the isolates from the supernatant. Preferably, the suspension will contain less than 15% solids and the isolates are at least twice washed in this manner. It is possible also to conduct the washing in continuous manner. At some point in preparing the isolate for hydrolysis, the proteinaceous material or isolate is heated in boiling water or otherwise for temperatures and times effective to condition the protein for efficient enzymatic hydrolysis; in the case of soy protein to destroy whatever trypsin inhibitors which may be present. The conditioning of the protein is typically a near complete denaturation. Boiling for from 5 to 10 minutes is generally effective.

After the protein isolate has been adequately washed, it is suspended in water. While the percentage of solids is not critical to the present invention, protein concentrations of from about 5 to 15 percent are considered effective. Higher concentrations are not preferred because of the resulting increase in viscosity which causes difficulties in mixing and handling. Lower concentrations are not preferred because this would increase the size of equipment required and require removal of greater amounts of moisture. Protein concentrations of from about 8 to 12 percent are preferred.

The protein isolate suspension is then adjusted to a near neutral pH, e.g., from about 6 to 7, and brought to the desired hydrolysis temperature, e.g., from about 25° to 65°C, preferably from about 35° to about 55°C. The enzymes are added and the reaction conducted for times effective to solubilize from about 50 to 90 percent of the protein material.

Two enzyme systems have been identified according to the present invention as being particularly effective in producing bland, soluble protein hydrolysates. One of these systems comprise ficin, papain and neutral protease from B. Subtilis. The total enzyme combination should contain from about 25,000 to about 500,000 protease units per 100 grams of protein. A protease unit, in this instance, is defined as that amount which acts on milk casein for 1 minute at 30°C and produces a quantity of Folin color producing substances, not precipitated by trichloroacetic acid, that is equivalent to 1 microgram of Tyrosine. Individually, the enzyme should be employed at levels of from about 10,000 to about 180,000 protease units for each 100 grams of protein. While it is generally preferred to add all the enzymes at the beginning of the reaction and carry out the reaction at a temperature selected for optimum overall effectiveness, e.g., 50°C, they may be added sequentially employing the optimum temperature for each enzyme for a period of time following its addition. Where the enzymes are added sequentially it is preferred that the last enzyme in the sequence is added no later than after 50 to 75 percent of the total reaction time.

The other of the two enzyme systems comprises ficin and neutral protease from B. Subtilis. The total enzyme activity in this embodiment will be the same as for the other. The individual enzymes will be present at levels of from about 10,000 to about 250,000 units for each 100 grams of protein. The same considerations for the reaction temperatures apply here as before. For best reaction, constant, efficient stirring is maintained throughout the period of reaction.

According to one preferred mode of the invention, the reaction is continued for about 2 hours at 50°C. Those skilled in the art will be aware of the relationship between time and temperature outside the preferred ranges. The reaction hydrolyzes and solubilizes the protein to an extent that from about 50 to about 90 percent, preferably from 65 to 75 percent, of the protein is solubilized and this soluble fraction has a molecular weight within the range of from 200 to 2900. Upon completion of the reaction the enzymes are inactivated. Preferably, this is accomplished by raising the temperature to a level and for a time effective to cause inactivation. Temperatures of from about 80° to 100°C and times of from about 2 to 10 minutes are generally effective, with the lower temperatures requiring longer times. This heating step also precipitates heat-insoluble fractions.

At this point, the soluble hydrolysate is separated from the insoluble material remaining in the suspension. This can be accomplished by any suitable technique such as filtration or centrifugation, with centrifugation being preferred. Preferably, the insoluble portion is washed to separate therefrom any further soluble hydrolysate, and the wash water is added to the solution of soluble hydrolysate. The protein hydrolysate in the soluble fraction will have a molecular weight range between 200 to 2900.

According to a preferred embodiment of this invention, the soluble hydrolysate is winterized and then dried to assure clarity when employed in low pH, chilled, transparent food substrates such as gelatin desserts. Winterizing and clarifying is typically effected by adjusting the pH of the hydrolysate, with a suitable acid such as HCl or $H_3PO_4$, to that of the material in which it will be employed, adding Celite diatomaceous earth, chilling for a time of from about 6–24 hours at about 0°C and then separating the insolubles such as by filtration. The hydrolysate is then flash concentrated and dried to assure clarity. Any suitable means for drying the hydrolysate can be employed. Freeze drying and spray drying have been found to be effective. After drying, the hydrolysate can be employed in a wide variety of food substrates in an amount effective to increase the nutritional value thereof.

In the preferred embodiments of the inventive concept of nutritionally fortifying foodstuffs, soy protein isolate is prepared from untoasted, solvent extracted soy grits as follows:

EXAMPLE I

Preparation of Soy Isolate

A 10 percent by weight aqueous slurry of soy grits is prepared and homogenized in a Waring Blendor for 3 minutes. The pH of the slurry is slowly adjusted to about 8.0 with sodium hydroxide and the slurry is stirred at ambient temperature for about 30 minutes. Next the mixture is centrifuged or filtered and the residue is discarded. The pH of the supernatant is adjusted to about 4.5 with hydrochloric acid and the acid mixture is brought to boiling and held there for approximately 6 minutes to destroy protease inhibitors, whereupon the mixture is cooled and centrifuged. The precipitate is then suspended in water and the pH is again adjusted to about 4.5. The acid mixture is centrifuged and the supernatant is discarded. The acid washing is repeated once more and the residue is then freeze dried for storage or resuspended to make a slurry for hydrolysis.

Hydrolysis of Soy Isolate

A 10 percent by weight slurry of soy isolate is prepared and the pH is adjusted to about 6.0 to 6.5. A proteolytic enzyme combination of ficin, papain and Neutral Protease from B. Subtilis (in respective amounts of 1:1:2) is then added at 0.5 percent by weight (total enzyme activity of about 125,000 protease units per 100 grams of protein) of the isolate and the slurry is incubated for about 2 hours at 50°C. Alternatively, a mixture of ficin and Neutral Protease from B. Subtilis (1:1 ratio) may be employed. At the end of the incubation period hydrolysis is terminated by raising the temperature to 90°C to inactivate the enzymes and precipitate the heat-insoluble fractions. The mixture is centrifuged and the residue is used in the next batch for further hydrolysis. The supernatant is adjusted to pH 3.9 with phosphoric acid (2.6N), if it is to be used in acidic foodstuff formulations such as fruit drinks, gelatin containing desserts etc. (For non-acidic formulations the pH is left as is). The supernatant is then winterized at 0°C overnight to remove the unstable cold labile fraction. The solution is then centrifuged or filtered and freeze dried. The molecular weight of this hydrolyzed protein ranges from 200 to 2900.

In the instance where the specific foodstuff is gelatin dessert and the freeze-dried hydrolyzed protein is derived from soy isolate, the nutritionally fortified dessert is prepared by adding the hydrolyzed isolate to conventional orange flavored gelatin dessert mix (gelatin, sucrose, citric acid, and buffer salts) in a ratio which provides from about 2.0 to 4.3 grams of the hydrolyzed protein per serving (which is about 21 to 25 grams of the conventional dessert solids). The dessert is then dissolved in hot water (70°C) while stirring, and permitted to cool (at about 10°C) and gel in the same manner as non-nutritionally modified gelatin desserts. The setting time, gel strength, and the organoleptic taste qualities are also substantially the same as non-nutritionally modified gelatin desserts. Unexpectantly, the clarity is better than conventional orange flavored gelatin dessert, as evidenced by optical density readings. For example, a Beckman DBG spectrophotometer is employed at a wavelength of 490 millimicrons to obtain optical density readings on conventional gelatin dessert and the nutritionally modified dessert. The control or conventional gelatin had an optical density at 490 mu, which is 0.07 units greater than nutritionally modified gelatin containing 2.0 grams of hydrolyzed protein per serving.

It is to be noted that protein from egg albumen and milk whey when washed and hydrolyzed according to the process of this invention may be employed either alone, with each other or in combination with soy protein, with comparably beneficial results in the foodstuffs disclosed herein.

EXAMPLE II

Preparation of Egg Albumen Isolate

Powdered or fresh egg white is employed in preparing a 5 percent by weight solution of egg white protein. The solution is adjusted to a pH of about 6.3 – 6.4 and then heated to about 85°C and maintained at this temperature for about 5 minutes to precipitate the egg protein. The mixture is cooled to room temperature and centrifuged, whereupon the supernatant is discarded thereby removing the major amounts of the egg smell and taste. The precipitate is suspended in fresh water (pH 6.3 – 6.5) and homogenized in a Waring Blendor, after which it is again centrifuged and the supernatant discarded. The washing step is repeated once more, and the washed precipitate is either freeze dried for storage or suspended in water to make a 5 percent protein solution for hydrolysis.

Hydrolysis of Egg Albumen Isolate

The pH of a 5 percent slurry of washed egg white isolate is adjusted to about 6.3 to 6.5 and the temperature of the slurry is raised to 40°C. A proteolytic enzyme mixture of 0.5 percent ficin, 0.5 percent papain and 1.0 percent Neutral Protease from B. Subtilis (total enzyme activity of 500,000 protease units per 100 grams of protein) is then added (based on the weight of egg isolate). Ficin and papain are first added and the hydrolysis is allowed to proceed for about 1 hour at 40°C, whereupon the temperature is raised to 50°C and Neutral Protease from B. Subtilis is added and the hydrolysis continued for another hour. At the end of the incubation period, the hydrolysis is terminated by heating the mixture to about 90°C to inactivate the enzymes and precipitate the heat-insoluble fraction. The mixture is cooled and centrifuged, whereupon the supernatant is freeze dried and the precipitate is used in the next batch for further hydrolysis. When the freeze dried supernatant is to be incorporated in coffee, the pH should be adjusted to about 5.0 prior to freeze drying. In tea, the pH adjustment should be about 5.3 and in chocolate drinks the pH should remain as is, i.e., about 6.0 to 6.3.

Where the specific foodstuff intended for nutritional fortification is coffee and the freeze dried hydrolyzed protein is derived from egg albumen isolate, the nutritionally enriched coffee is prepared by adding 2 to 4 percent of the MDR (minimum daily requirements) i.e., about 1.6 to 3.2 grams/cup (MDR=70 grams protein/day) either by adding the hydrolyzate to the coffee extract prior to freeze drying the extract or direct addition by dry mixing with soluble or instant coffee.

It will be appreciated that protein hydrolyzate derived from egg albumen according to the process of this invention is unique in that it is particularly compatible with the overall flavor, mouthfeel and appearance of coffee. Moreover, the temperatures at which coffee is served does not denature, coagulate or precipitate the hydrolyzate. on the other hand, soy derived proteinaceous hydrolyzates are organoleptically incompatible with coffee flavors and taste, despite the fact that the molecular weight range of the soy hydrolyzate is similar to the egg albumen hydrolyzate, i.e., 200–2900.

EXAMPLE III

Preparation of Whey (Milk) Isolate

Fresh milk whey or dried whey powder is employed in preparing a 5 to 10 percent slurry of whey protein powder. The slurry is then adjusted to a pH of about 5.3 to 5.5 and then heated to boiling to precipitate the proteins. The mixture is cooled and centrifuged, whereupon the supernatant is discarded. The precipitate is resuspended in water having a pH of about 5.3 to 5.5, after which it is again centrifuged and the supernatant discarded. This washing step is repeated once more, and at this stage the lactose content, salts and milky taste is substantially reduced. The precipitate is then freeze dried for storage or resuspended to make a slurry for hydrolysis.

Hydrolysis of Whey Isolate

A 5 to 10 percent by weight slurry of whey isolate is prepared and the pH is adjusted to about 6.0 to 6.5. A proteolytic enzyme combination of 0.5 percent ficin, 0.5 percent papain and 1.0 percent Neutral Protease from B. Subtilis (total enzyme activity of about 500,000 protease units per 100 grams of protein) is then added (based upon the weight of whey isolate). Ficin and papain are first added and the hydrolysis is allowed to proceed for about 1 hour at 40°C, whereupon the temperature is raised to 50°C and Neutral Protease from B. Subtilis is added and the hydrolysis continued for another hour. At the end of the incubation period hydrolysis is terminated by raising the temperature to about 90°C to inactivate the enzymes and precipitate any possible heat-insoluble fractions, which may be used in the next batch for further hydrolysis. The supernatant is winterized at 0°C overnight if it is to be used in a foodstuff formulation requiring clarity, otherwise it is centrifuged and freeze dried. If it is to be incorporated in acidic formulations, the pH must be adjusted to about 4.0 prior to freeze drying. This hydrolyzed protein will have a molecular weight range between 200 – 2900.

Inclusive of the ambit of this invention is the addition of proteinaceous hydrolyzates to an alcoholic fermented beverage, either before or after fermentation or at any time during the brewing process.

EXAMPLE IV

A standard brewing process is used to prepare small scale brews. Brewers malt and common corn grits are employed to make 70/30 malt/adjunct mashes and produce worts of 12.3° Plato for fermentation. These worts are pitched with brewers yeast at a rate approximately 1 lb/bbl and fermented 7 days at about 54°F. Additions of soy protein hydrolyzate prepared according to Example I is made according to the schedule following:

Brew 1 — 3% by weight after fermentation
Brew 2 — 1% by weight after fermentation
Brew 3 — 3% by weight before fermentation
Brew 4 — untreated control In the case of brew No. 3, the addition is made to the wort immediately before pitching with yeast. Brews 1 and 2 are treated by adding the hydrolyzate to storage vessels prior to introducing the fermented wort. These vessels are thoroughly flushed with $CO_2$ before filling with beer.

A storage period of 3 weeks at 32°F was accorded all samples before finishing. Three bottles of each set are not pasteurized, while the remainder are pasteurized at 140°F for 15 minutes.

Observations made on the protein enriched beer indicated that: Increased foaming presented no processing difficulties; it had normal appearance with no noticeable change in gross yeast crop; during aging the yeast settled more rapidly in beers containing the hydrolyzed protein; and the beer was stable for periods over 6 months. The flavor of the beers with protein was the same as that of the control.

The inventive concepts disclosed herein also embrace the utilization of enzymatically hydrolyzed proteins prepared in accordance with the invention for nutritionally enriching dry-mix acidic beverages as well as carbonated soft beverages. In the case of carbonated beverages the hydrolyzate may be added before, during or after the beverage is fully processed.

In the case of a dry beverage mix the formation is prepared as follows:

EXAMPLE V

| | |
|---|---|
| Sugar | 30.0 |
| Citric Acid | 2.0 |
| Orange Flavor | 0.6 |
| Trisodium Citrate | 0.3 |
| Orange Color | 0.1 |
| Whey Protein Hydrolyzate | 8.0 |
| | 41.0 |

The dry mix is dispersed in about 8 ounces of cold water by shaking in a closed container to provide a solution having ingredients which did not separate out after standing for several days in a refrigerator.

While the invention has been described by reference to specific examples, it will be understood that the inventive concept has application to many foodstuffs wherein it is desirous to nutritionally fortify the foodstuff without detracting from those qualities typically characteristic and unique to the particular foodstuff. Thus, tea, cereals, fruit drinks, and many other foodstuffs may be enriched by proteins prepared according to the process of the invention without departing from the spirit and scope of the invention.

What is claimed is:

1. An improved process for preparing a bland, enzymatically hydrolyzed, soluble, nutritious, proteinaceous material comprising:
   a. obtaining a protein isolate;
   b. washing the isolate sufficiently to substantially remove off flavors and odors;
   c. preparing a slurry of the protein isolate and water;
   d. adjusting the slurry pH to between about 6 to 7;
   e. adding to the slurry a proteolytic enzyme mixture of ficin, papain, and neutral protease from B. Subtilis;
   f. incubating the resulting mixture for a period of time to hydrolyze the protein and solubilize from 50 to 90 percent of the protein to provide a soluble fraction having a molecular weight of from 200 to 2900;
   g. terminating the incubation by heating the mixture to a temperature sufficient to inactivate the enzymes and precipitate heat-insoluble fractions of the isolate;
   h. recovering the soluble protein fraction having a molecular weight from 200 to 2900; and
   i. drying the soluble protein fraction.

2. The process of claim 1, wherein the protein isolate is prepared from egg albumen and wherein the hydrolysis is begun at about 40°C in the presence of a mixture of ficin and papain, and completed at about 50° after the addition of neutral protease from B. Subtilis.

3. The process of claim 2 wherein the egg white protein isolate is prepared by heating egg white to coagulate the protein.

4. The process of claim 1, wherein the protein isolate is prepared from milk whey, and wherein the hydrolysis is begun at about 40°C in the presence of a mixture of ficin and papain, and completed at about 50°C after the addition of neutral protease from B. Subtilis, all three enzymes being present at the same time for from 25 to 50 percent of the total reaction time.

5. The process of claim 4, wherein the milk whey protein isolate is prepared by: preparing a slurry of whey powder in water, adjusting the pH of the slurry to about 5.3 to 5.5, then heating the slurry to precipitate the protein and washing the precipitated milk whey protein in a dilutely acid aqueous solution.

6. The process of claim 1, wherein the protein isolate is prepared from soy, and wherein the hydrolysis is conducted at about 50°C.

7. The process of claim 6 which additionally comprises the step of treating the isolate to destroy protease inhibitors before hydrolysis of the protein with the enzyme mixture.

8. An improved process for preparing a bland, enzymatically hydrolyzed, soluble, non-gelatin, proteinaceous material comprising:
 a. obtaining a soy protein isolate;
 b. washing the isolate sufficiently to substantially remove off flavors and odors;
 c. preparing a slurry of the soy isolate in water;
 d. adjusting the slurry pH to between 6–7;
 e. adding to the slurry a proteolytic enzyme mixture of ficin and neutral protease from B. Subtilis;
 f. incubating the resulting mixture for a period of time to hydrolyze the protein and solubilize from 50 to 90 percent of the protein to provide a soluble fraction having a molecular weight of from 200 to 2900;
 g. terminating the incubation by heating the mixture to a temperature sufficient to inactivate the enzymes and precipitate heat insoluble fractions of the isolate;
 h. recovering the soluble protein fraction having a molecular weight from 200 to 2900; and
 i. drying the soluble protein fraction.

* * * * *